United States Patent [19]

Becker et al.

[11] Patent Number: 5,102,490

[45] Date of Patent: Apr. 7, 1992

[54] APPARATUS FOR APPLYING TIRE SHEET COMPONENTS

[75] Inventors: Michael L. Becker, Akron; Bernhard W. Kuchel, Clinton; Ralph D. Ring, Akron, all of Ohio

[73] Assignee: The Goodyear Tire & Rubber Company, Akron, Ohio

[21] Appl. No.: 608,694

[22] Filed: Nov. 5, 1990

[51] Int. Cl.⁵ .................................. B29D 30/30
[52] U.S. Cl. ........................ 156/406.4; 156/130.3; 156/134; 156/468; 156/486
[58] Field of Search .............. 156/405.1, 406.4, 123, 156/130, 130.3, 133, 134, 408, 447, 468, 486; 226/95, 180; 198/689.1; 83/152, 153

[56] References Cited

U.S. PATENT DOCUMENTS

| | | | |
|---|---|---|---|
| 3,152,945 | 10/1964 | Jackson | 156/522 |
| 3,852,142 | 12/1974 | Leblond et al. | 156/395 |
| 4,009,072 | 2/1987 | Schultz et al. | 156/584 |
| 4,105,487 | 8/1978 | Suzuki et al. | 156/405 R |
| 4,261,786 | 10/1978 | Martin et al. | 156/394 |
| 4,465,536 | 8/1984 | Makino et al. | 156/405.1 X |
| 4,526,647 | 7/1985 | Portalupi et al. | 156/406.4 |
| 4,617,074 | 10/1986 | Portalupi et al. | 156/130 |
| 4,738,743 | 4/1988 | Satoh et al. | 156/405 |
| 4,761,195 | 8/1988 | Hart | 156/116 |
| 4,792,372 | 12/1988 | Alexander et al. | 156/394.1 |

FOREIGN PATENT DOCUMENTS 2108060 8/1981 United Kingdom .

*Primary Examiner*—Geoffrey L. Knable
*Attorney, Agent, or Firm*—T. P. Lewandowski; Frederick K. Lacher

[57] ABSTRACT

A tire sheet component is cut and applied to a drum with a retractable applier having a cutter and anvil member for cutting the sheet component at a first position spaced from the drum. Vacuum means are provided for holding the cut leading end on the anvil as it is moved to a second position where the anvil is moved towards the drum to press the leading end portion of the sheet component against the drum with a stitcher roll. The anvil is then moved in a sweeping motion to stitch the leading end against the drum. The drum is rotated a predetermined amount and the sheet is stitched to the drum with a second stitcher roll. The sheet component is cut at the first position providing a trailing end which is then stitched to the drum as it is rotated the final amount.

6 Claims, 6 Drawing Sheets

APPARATUS FOR APPLYING TIRE SHEET COMPONENTS

This invention relates generally to the applying of tire sheet components such as plies or inner liners on a cylindrical body such as a drum. The invention also includes the provision of servicing stitching and cutting the tire sheet components in one unit. With the apparatus of the invention, the leading edge portion of a tire sheet component may be applied with precision and the length of the uncontrolled trailing end portion is minimized to avoid distortion and length variations of the trailing end portion.

Heretofore it has been proposed to apply a tire ply to a drum with an applier in which the leading end portion of the ply was picked up and carried to the drum by a moveable frame. Vacuum ports in the frame retained the leading end portion until it was released for stitching on the drum. The picking up and releasing of the leading end is not desirable because it permits distortion and length variations of the ply at the leading end portion. The uncontrolled trailing portion of the tire ply between the cutter and the drum has also been of substantial length which is not desirable because it permits length variations and distortion at the trailing end portion of the tire ply.

The present invention provides a multi segmented tire sheet component applier with a relatively short retracted length. The segments retract and extend during the application cycle. The leading end portion of the tire sheet component is also held on the cutting anvil and moved with the anvil to the tire building drum where it is applied without distortion or length variation. The cutting anvil and knife are located close to the drum so that the uncontrolled length of the tire sheet component at the trailing end is minimized which reduces the possibility of length variations and distortion of the trailing portion of the tire sheet component.

The retention of the leading end portion and trailing end portion of the tire sheet component on the anvil member is provided by a split vacuum chamber which provides the necessary control of the tire sheet component for precision application to the drum.

In accordance with one aspect of the invention, there is provided apparatus for cutting and applying a sheet of flexible material to a cylindrical body comprising an applier frame segment movably mounted on a supporting frame member, an anvil frame segment movably mounted on the applier frame segment and an anvil nose segment movably mounted on the anvil segment, means for retracting and extending the applier frame segment, the anvil frame segment, and the anvil nose segment between a retracted position spaced from the cylindrical body and an extended position adjacent the cylindrical body, an anvil member mounted on the anvil nose segment, a knife assembly mounted on the applier frame segment at a position for cutting the sheet of flexible material in cooperation with the anvil member, a stitcher roll carried by the anvil nose segment, means for actuating the knife assembly to cut the sheet providing a leading edge portion of the sheet, means for extending the anvil frame segment to a position adjacent the cylindrical body with the leading edge portion held on the anvil of the anvil nose segment, means for moving the applier frame segment and the anvil frame segment to position the leading edge portion on the cylindrical body and sweeping means for rolling the stitcher roll over the leading edge portion on the cylindrical body, means for actuating the knife assembly after rotation of the cylindrical body a predetermined amount providing a trailing end portion of the sheet and means for stitching the trailing end portion on the cylindrical body.

In accordance with another aspect of this invention, there is provided a method of cutting and applying a sheet of (a) cutting the sheet with a knife means engagable with an anvil member spaced from the cylindrical body providing a leading end portion;
(b) holding the leading end portion on the anvil member;
(c) moving the anvil member with the leading end portion to a predetermined position adjacent the cylindrical body;
(d) releasing the leading end portion from the anvil;
(e) urging part of the leading end portion of the sheet against the cylindrical body;
(f) sweeping the anvil member and stitching the remainder of the leading end portion on the cylindrical body;
(g) rotating the cylindrical body and continuing to stitch the sheet material to the cylindrical body;
(h) moving the anvil member to a position adjacent the knife means and cutting the sheet to provide a trailing edge portion; and
(i) rotating the cylindrical body and stitching the trailing end portion on said cylindrical body.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts, can be modified in numerous ways within the spirit and scope of the invention defined in the claims hereof.

Figure 1:
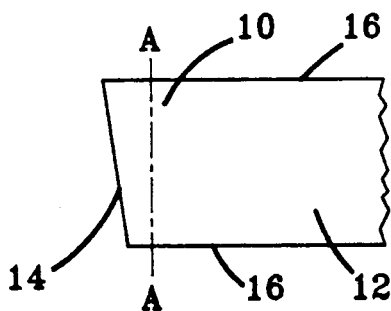
FIG. 1 is a fragmentary plan view of the leading portion of a tire ply showing the line of contact where the ply is first pressed against the drum by the rear stitcher roll.

Referring to FIG. 1, a leading portion 10 of a tire sheet component such as a tire ply 12 is shown after being cut to provide the leading edge 14. The ply 12 has cords (not shown) which may be at an angle to a line of contact A—A extending perpendicular to sides 16 of the ply. It is understood the leading edge 14 may be at different angles or perpendicular to the sides 16. The tire sheet component may also be a tire liner.

FIGS. 2 through 7 shows schematically a retractable, segmental tire sheet component applier 18 in various positions during the application of the tire ply 12. The applier 18 is retractable to the "home" position shown in FIG. 2 and extendable to the fully extended position shown in FIGS. 3 and 4 and the partially extended position shown in FIGS. 5, 6 and 7.

Figure 7:
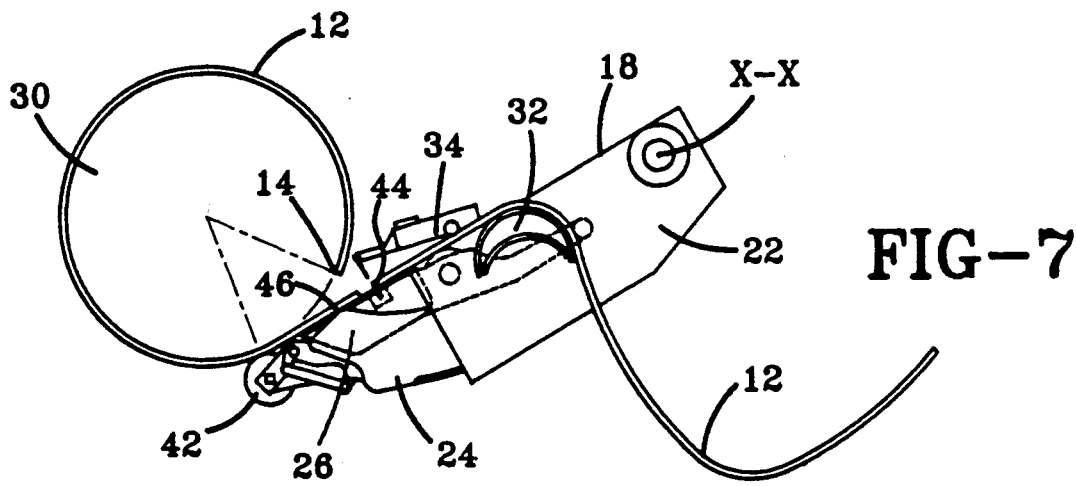
Figure 8:
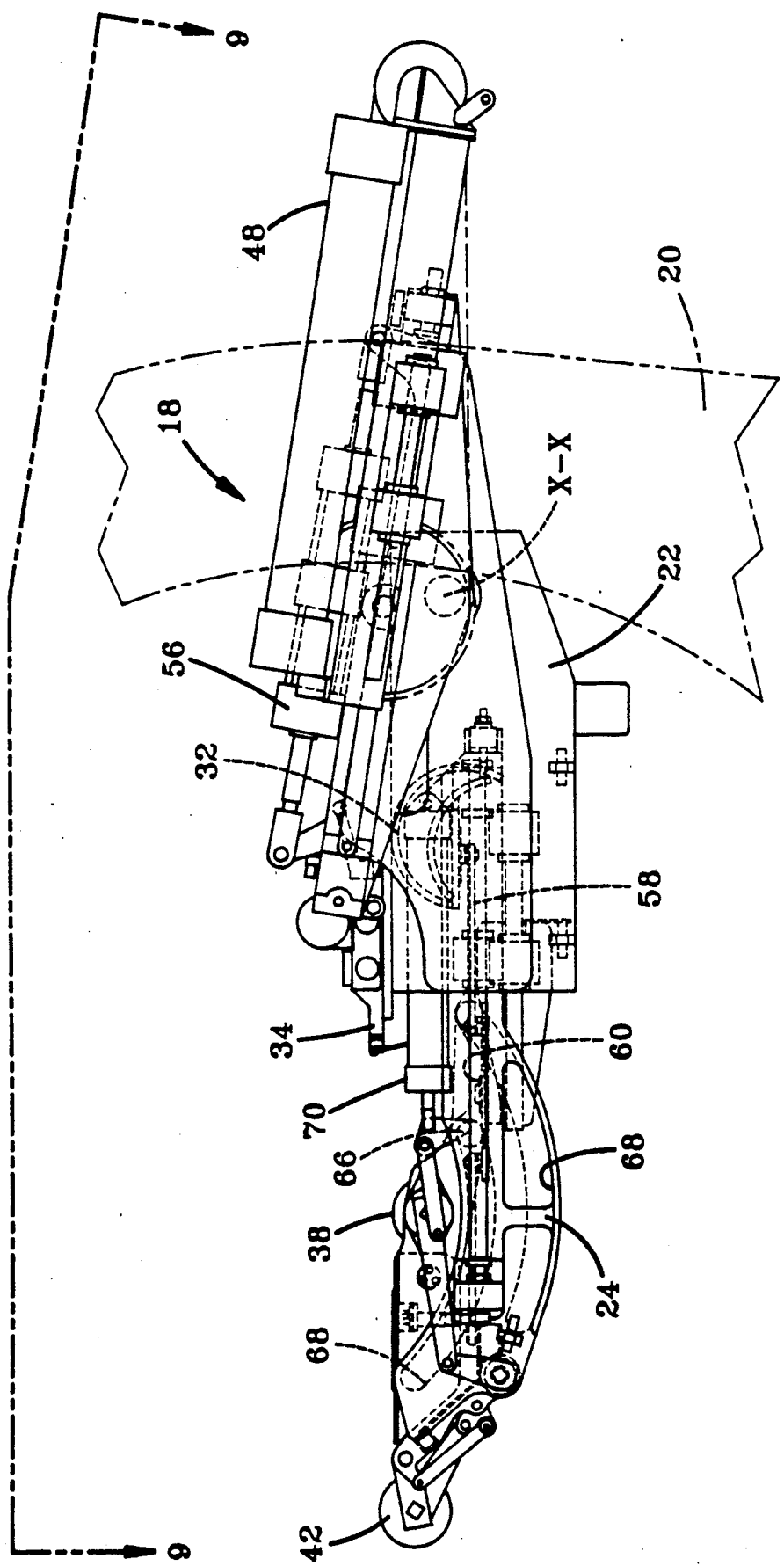
FIG. 8 is an enlarged side elevation of the apparatus shown in the extended position corresponding to the schematic view in FIG. 3.

The tire sheet component applier 18 is slidably mounted on supporting frame members 20, not shown in the schematic drawings but indicated by dash-dot-dot lines in FIG. 8. An applier frame segment 22 is slidably mounted on the supporting frame members 20 and may be extended from the position shown in FIG. 2 to the positions shown in FIGS. 3 through 7. The applier frame segment 22 is rotatable about an axis X—X so that the applier 18 can be rotated between the positions shown in FIGS. 3 and 4. An anvil frame segment 24 is slidably mounted on the applier frame segment 22 for sliding movement from the retracted position shown in FIG. 2 to the fully extended position shown in FIGS. 3 and 4 and the intermediate position shown in FIGS. 5, 6 and 7. An anvil nose segment 26 is slidably mounted on the anvil frame segment 24 for moving an anvil member 28 from a retracted cutting position shown in FIG. 6 to an extended sweeping position shown in FIG. 4. A cylindrical body such as tire building drum 30 is rotatably mounted on a tire building machine base (not shown) of a type well known to persons skilled in the art. The tire sheet component applier 18 may be one of several appliers positioned near the drum 30 for applying different sheet components during the building of a tire on the drum 30.

Figure 2:
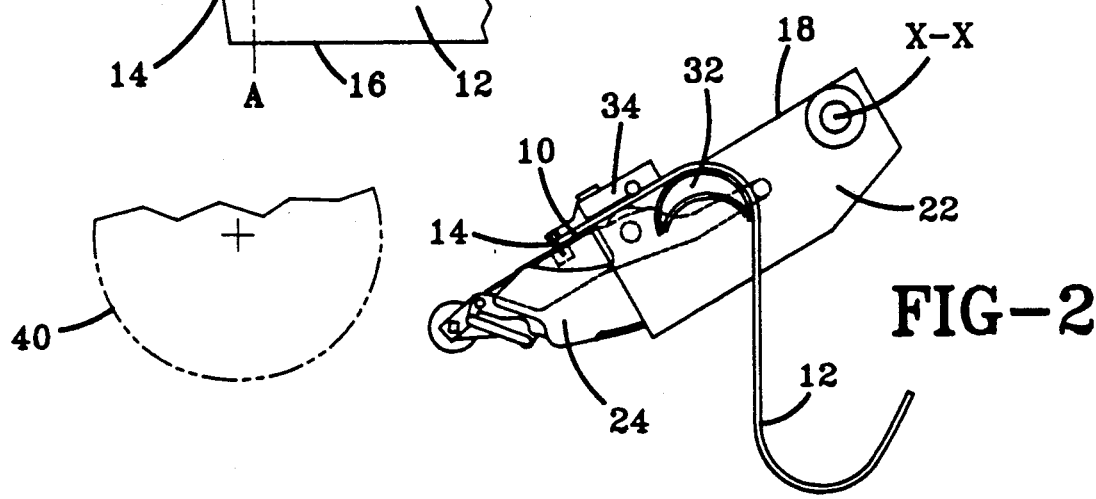
FIGS. 2 through 7 are schematic views of the apparatus and tire building drum showing the steps in cutting and applying a tire ply to a drum.

A tire ply 12 is supplied from a suitable roll of stock and extends through a free loop over an air roll 32 to a position over the anvil member 28 and under a suitable cutter 34 slidably mounted on the applier frame segment 22 which as shown in FIG. 2 has been activated to cut the tire ply material and provide the leading edge 14. Fence guides 36 may also be mounted on the applier frame segment 22 at either side to direct the tire ply 12 through the applier 18.

Figure 3:
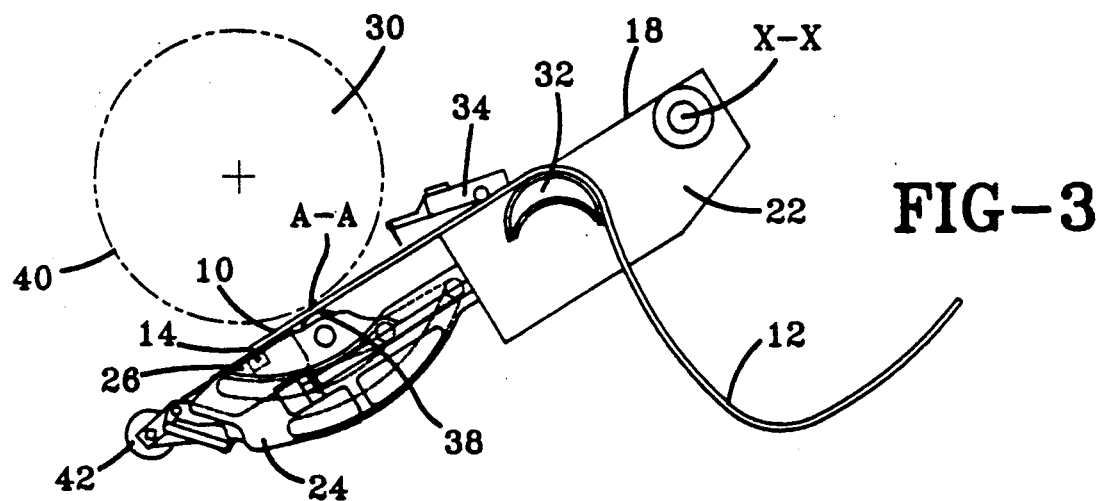

As shown in FIG. 3, the leading portion 10 of the tire ply 12 is held on the anvil member 28 as by a vacuum and moved with the anvil member to the position shown in FIG. 3 with a rear stitcher roll 38 mounted on the anvil member and positioned at the line of contact A—A of the leading portion 10 so that when the applier 18 is rotated clockwise about the axis X—X, the line of contact A—A will be pressed against an outer cylindrical surface 40 of the drum 30. The vacuum holding the leading end portion 10 on the anvil member 28 is then discontinued and the anvil nose segment 26 moves in a sweeping motion to the sweeping position shown in FIG. 4 causing the rear stitcher roll 38 to stitch the leading portion against the cylindrical surface 40 of the drum 30.

Figure 5:
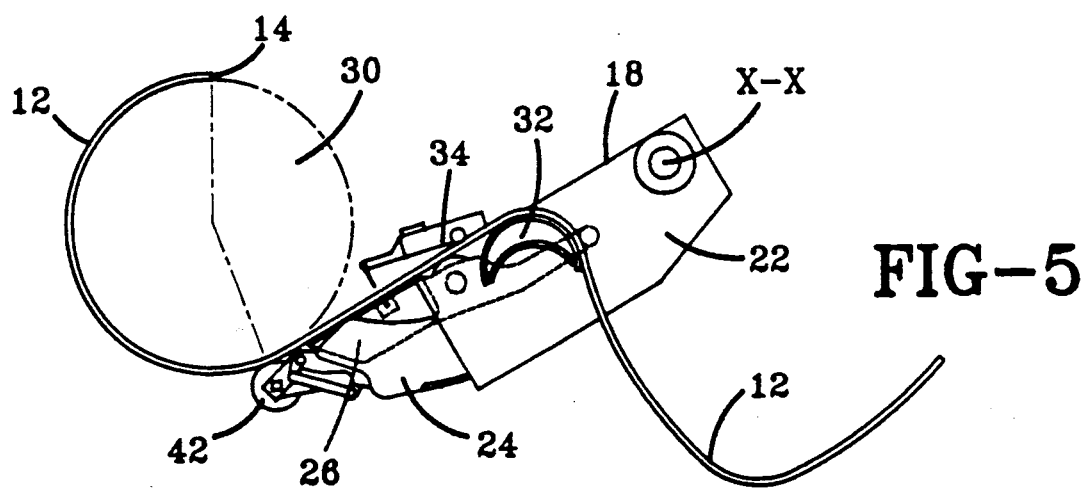
Figure 6:
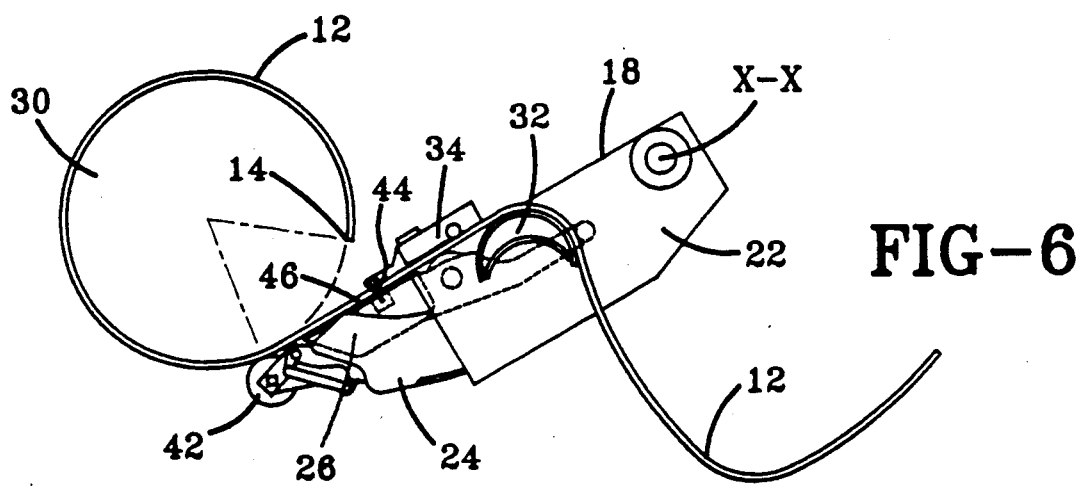

The anvil nose segment 26 is then retracted into the anvil frame segment which is then retracted to the intermediate position shown in FIG. 5, 6 and 7 with a trailing switcher roll 42 pressing the tire ply 12 against the cylindrical surface 40 as the drum 30 is rotated in a clockwise direction as shown in FIG. 5. The drum 30 is rotated until it reaches a position where the ply 12 is spotted for cutting the trailing end as shown in FIG. 6. The vacuum is applied to the ply 12 on both sides of an anvil cutting groove 43. The cutter 34 is then actuated and the ply 12 cut. The vacuum is maintained on a leading end 44 of a next tire sheet component to be applied and the drum 30 is rotated to the position shown in FIG. 7 where a trailing end portion 46 is stitched to the cylindrical surface 40 of the drum 30. The applier frame segment 22 and anvil frame segment 24 can then be retracted to the position shown in FIG. 2 so that the next tire sheet component may be applied in the same manner as described hereinabove.

Figure 9:
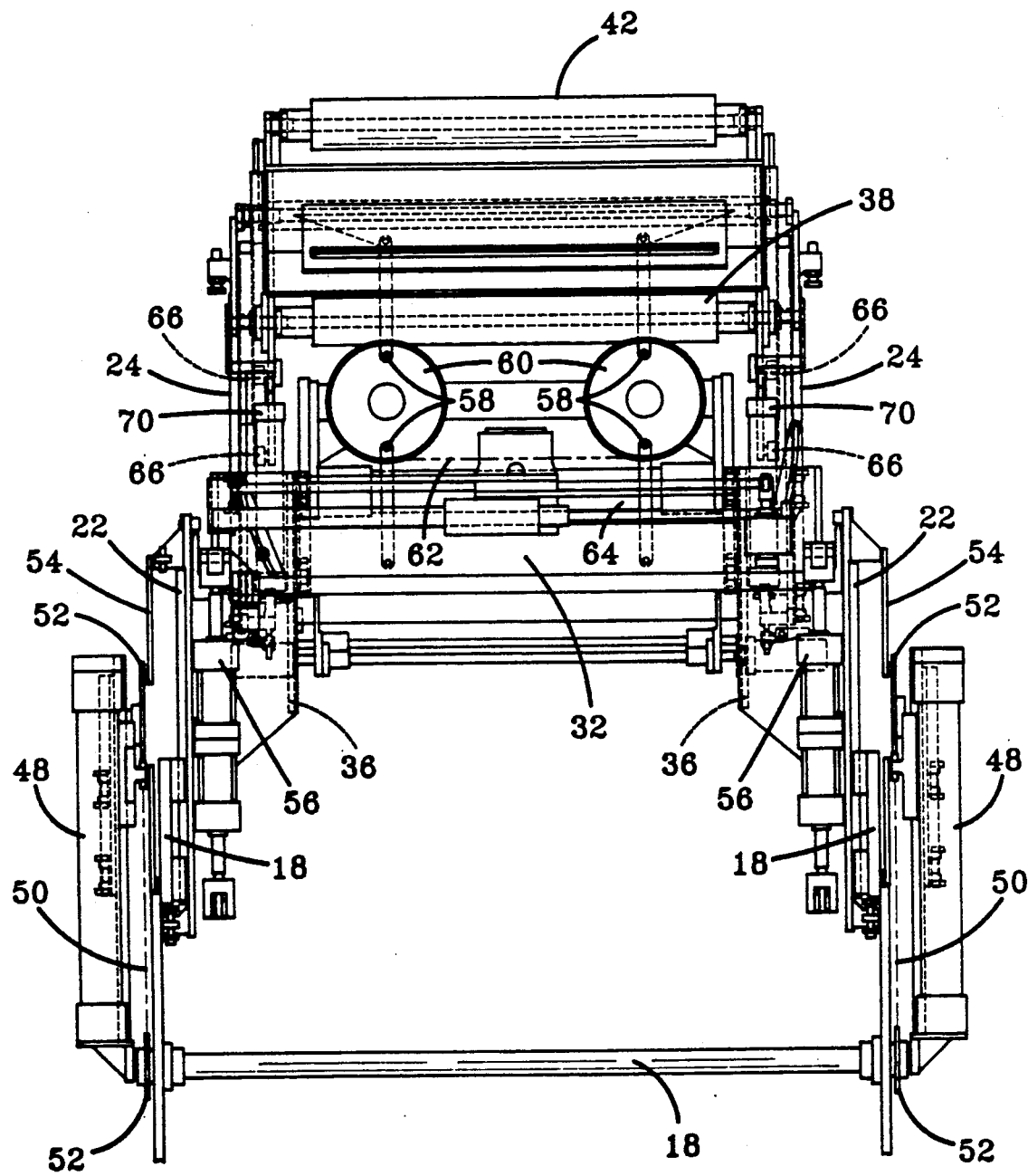
FIG. 9 is a plan view of the apparatus taken along line 9—9 in FIG. 8.

Referring to FIGS. 8 and 9, more detailed drawings showing the tire sheet component applier 18 are provided. Mounted on the supporting frame members 20 are rodless band cylinders 48 connected to chains 50 trained around sprockets 52. One pair of the sprockets 52 have crank arms 54 connected to the applier frame segment 22 for extending and retracting the segment. The applier frame segment 22 which is rotatable about the axis X—X is connected to the supporting frame member 20 by tilting piston cylinder assemblies 56 which may be pneumatic and operable for tilting the applier between the positions shown in FIGS. 3 and 4. The anvil frame segment 24 is connected to the applier frame segment 22 by crank arms 58 pivotally connected to sprockets 60 around which a chain 62 is trained. The chain 62 is connected to a rodless band cylinder which moves the chain to rotate the sprockets 60 simultaneously and the same amount for extending and retracting the anvil frame segment 24. As shown in FIGS. 8 and 9, the trailing stitcher roll 42 is mounted on an end of the anvil frame segment 24 and is moveable into stitching position as shown in FIG. 5, 6 and 7 by retraction of the applier 18 to the intermediate position.

Figure 4:
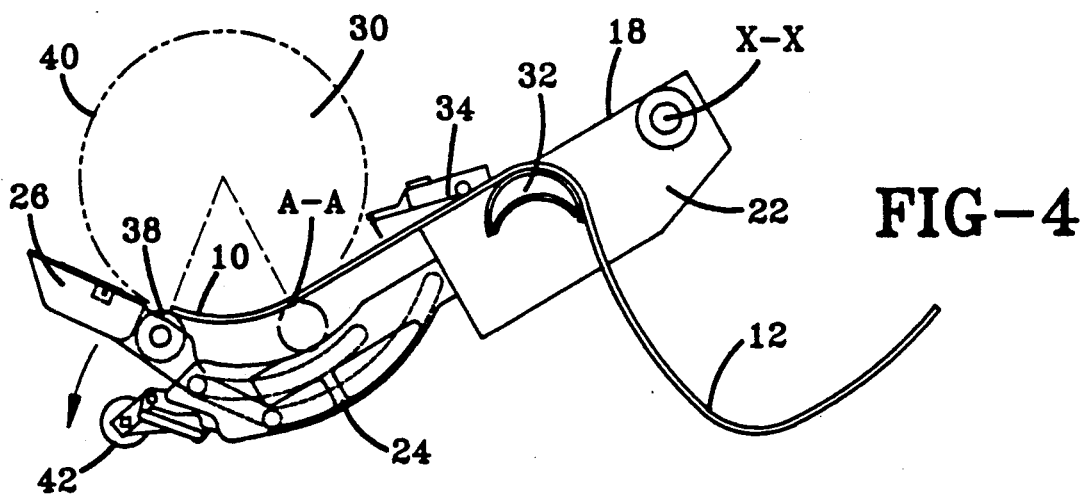
Figure 10:
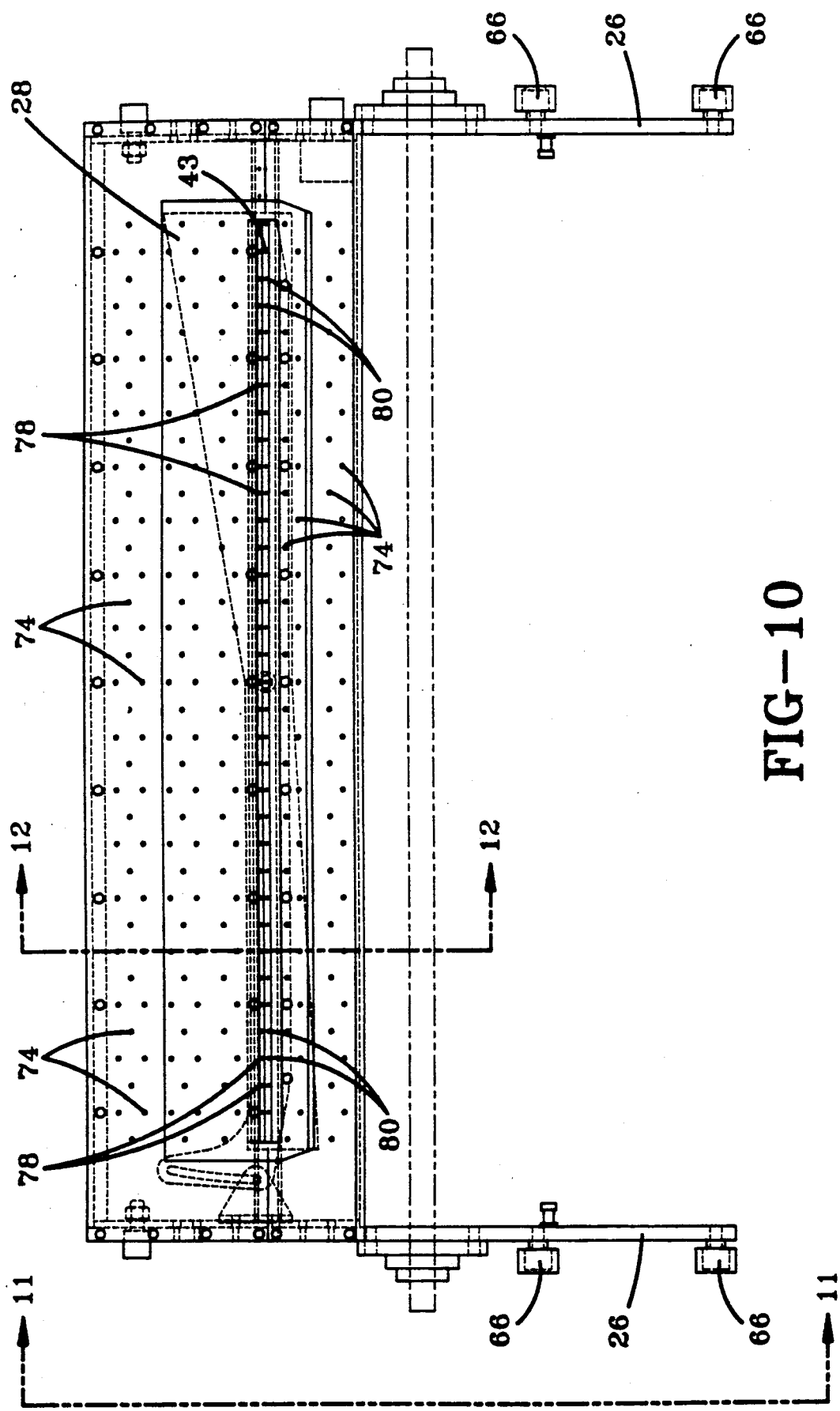
FIG. 10 is an enlarged plan view of the anvil nose segment.
Figure 11:
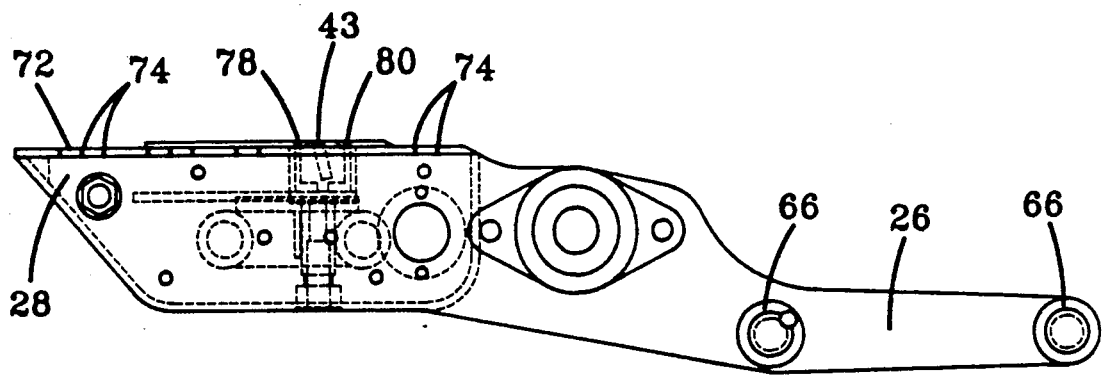
FIG. 11 is a side view of the anvil nose segment taken along line 11—11 in FIG. 10.
Figure 12:
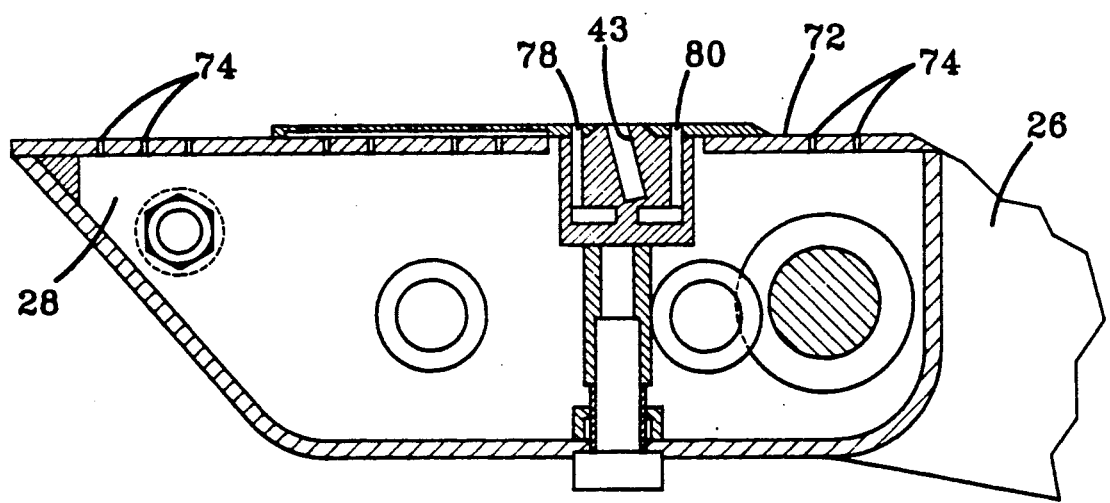
FIG. 12 is an enlarged cross-section of the anvil member taken along line 12—12 in FIG. 10.

Referring further to FIGS. 10, 11 and 12, the anvil nose segment 26 is positioned between the sides of the anvil frame segment 24 and has rollers 66 positioned in guide slots 68 in the anvil frame sides. The guide slots 68 are curved so that as the anvil nose segment 26 is moved towards the drum 30, the rear stitcher roll 38 will stitch the leading portion 10 against the cylindrical surface 40 of the drum 10 as shown in FIG. 4. The anvil nose segment 26 is extended and retracted by sweep cylinder and piston assemblies 70 extending between the anvil nose segment and anvil frame segment 24.

Referring further to FIG. 12, the anvil member 28 is shown in greater detail and comprises a vacuum pan 72 with openings 74 in communication with a low pressure vacuum to control the trailing end portion 46 and leading portion 10 as these portions are pulled away from the anvil member. Directly in front and behind the anvil cutting groove 76 are high pressure vacuum trailing edge openings 78 and leading edge openings 80 which can be operated together or independently. In operation, both the trailing edge openings and leading edge openings 78 and 80 are communicated to high pressure vacuum during the cutting operation. Then after the cutting operation, the high pressure vacuum is discontinued for the trailing edge openings 78 but is maintained for the leading edge openings 80. In this way, the trailing end portion 46 may be smoothly pulled away from the anvil member 28 for stitching on the cylindrical surface 40 of the drum 30. The high pressure vacuum holds the leading portion 10 on the anvil member 28 as it is moved from the position shown in FIG. 2 to the position shown in FIG. 3. Then after the rear stitcher roll 38 presses the ply 12 at the line of contact A—A against the cylindrical surface 40, the high pressure vacuum communicated to the leading edge openings 80 is discontinued whereupon the rear stitcher roll 38 is moved in the sweeping action to stitch the leading portion 10 on the cylindrical surface.

In addition to the source of vacuum which may be provided by air pressure with aspirators, the rodless band cylinders 48 and 64 and the tilting piston cylinder assemblies 56 and sweep cylinder piston assembly 70 may be connected to suitable sources of air pressure. Also the controls for this power equipment may be of the type well known to those skilled in the art. Electric motors may also be provided for the fence guides 36 and proximity switches. Stroke adjustment blocks may also be provided on each segment.

While a certain representative embodiment and details have been shown for the purpose of illustrating the invention, it will be apparent for those skilled in the art that various changes and modifications may be made therein without departing from the spirit or scope of the invention.

What is claimed is:

1. Apparatus for cutting and applying a sheet of flexible material to a cylindrical body comprising a cylindrical body, an applier frame segment movably mounted on a supporting frame member, an anvil frame segment movably mounted on said applier frame segment, and an anvil nose segment movably mounted on said anvil frame segment, first means for retracting and extending said applier frame segment, second means for retracting and extending said anvil frame segment and third means for retracting and extending said anvil nose segment between a retracted position spaced from said cylindrical body and an extended position adjacent said cylindrical body, an anvil member mounted on said anvil nose segment, a cutter assembly mounted on said applier frame segment at a position for cutting said sheet of flexible material in cooperation with said anvil member, a stitcher roll carried by said anvil nose segment, fourth means for actuating said cutter assembly to cut said sheet providing a leading edge portion of said sheet, said second means being capable of extending said anvil frame segment to a position adjacent said cylindrical body with said leading edge portion held on said anvil member of said anvil nose segment, said first means being capable of moving said applier frame segment and said anvil frame segment to position said leading edge portion on said cylindrical body and said third means further including means for rolling said stitcher roll over said leading edge portion in a sweeping motion about said cylindrical body, said fourth means also being capable of actuating said cutter assembly after rotation of said cylindrical body a predetermined amount to apply said sheet to said cylindrical body providing a trailing edge portion of said sheet, means for rotating said cylindrical body to apply said trailing edge portion of said sheet to said cylindrical body and said second means also being capable of retracting said anvil frame segment from said cylindrical body.

2. Apparatus in accordance with claim 1 wherein said applier frame segment is slidably mounted on said supporting frame member, said anvil frame segment is slidably mounted on said applier frame segment, and said anvil nose segment is slidably mounted on said anvil frame segment.

3. Apparatus in accordance with claim 1 including vacuum means in communication with said anvil member for holding said leading edge portion on said anvil member.

4. Apparatus in accordance with claim 3 wherein said vacuum means includes high pressure vacuum in communication with leading edge openings and trailing edge openings for selectively holding the trailing edge portion and leading edge portion of said sheet.

5. Apparatus for cutting and applying a sheet of flexible material to a cylindrical body comprising a cylindrical body, an anvil member movable from a first position spaced from said cylindrical body to a second position adjacent said cylindrical body, a cutter assembly for cutting said sheet in cooperation with said anvil member in said first position providing a leading end portion of said sheet having a leading edge, means to hold said leading edge and said leading end portion on said anvil member, means to move said anvil member from said position to said second position, roller means mounted on said anvil member for pressing a part of said leading end portion of said sheet against said cylindrical body at said second position and means to move said anvil member in a sweeping motion about said cylindrical body to stitch the remaining part of said leading end portion on said cylindrical body with said roller means.

6. Apparatus in accordance with claim 5, wherein said means to hold said leading edge and said leading end portion of said sheet comprises vacuum means in communication with a surface of said anvil member for holding said leading end portion in the same position it is cut.

* * * * *